US009838145B2

(12) United States Patent
Tawfiq Moshtaha et al.

(10) Patent No.: US 9,838,145 B2
(45) Date of Patent: Dec. 5, 2017

(54) METHOD AND SYSTEM FOR TRANSMITTING AND/OR RECEIVING ADVERTISEMENT AND DATA CONTENTS AND PROVIDING MULTIPLE VALUE ADDED SERVICES ON ELECTRONIC COMMUNICATION DEVICE WITH A DISPLAY MECHANISM

(71) Applicants: Basil Nasri Tawfiq Moshtaha, Sharjah (AE); Saif Saeed BinSaed AlSuwaidi, Sharjah (AE)

(72) Inventors: Basil Nasri Tawfiq Moshtaha, Sharjah (AE); Saif Saeed BinSaed AlSuwaidi, Sharjah (AE)

( * ) Notice: Subject to any disclaimer, the term of this patent is extended or adjusted under 35 U.S.C. 154(b) by 0 days.

(21) Appl. No.: 15/390,523

(22) Filed: Dec. 25, 2016

(65) Prior Publication Data
US 2017/0250768 A1 Aug. 31, 2017

Related U.S. Application Data

(63) Continuation of application No. 13/412,633, filed on Mar. 6, 2012, now abandoned.

(51) Int. Cl.
*H04H 20/71* (2008.01)
*H04L 12/24* (2006.01)
(Continued)

(52) U.S. Cl.
CPC ....... *H04H 20/71* (2013.01); *G06F 17/30035* (2013.01); *G06F 17/30241* (2013.01);
(Continued)

(58) Field of Classification Search
CPC ........ H04H 60/31; H04H 60/51; H04H 60/33; H04H 60/91; H04H 20/42; H04H 60/42;
(Continued)

(56) References Cited

U.S. PATENT DOCUMENTS

2007/0077922 A1* 4/2007 Kim ...................... H04H 20/57
455/414.2

* cited by examiner

*Primary Examiner* — Keith Ferguson
(74) *Attorney, Agent, or Firm* — Barry Choobin; Patent 360

(57) ABSTRACT

The various embodiments herein provide a method and system for sending data content and advertising and providing multiple value added services on a user screen of a mobile communication device and any electronic portable/non portable device. The system and method comprising installing software application on the user's communication device for sending and/or receiving content and for utilizing the available value added services; one or more Application Server that provides business logic and respond to all requests; one or more Application Programmable Interface Server that integrate with content delivery platforms in a communication network; one or more Community Server that integrate with service provider servers at emergency response centers, transportation centers, and hospitals to send subscriber service request to these centers; one or more Web Server where all connections and requests terminate and which forwards all requests to the application server; one or more Database Server that store subscribers profiles; one or more Statistics Server that generate rich reports and statistics of usage and subscribers' interactions; one or more Administration Server which administrations can use to upload, schedule, plan, and provision content and services and view logs of all transactions performed in the system.

11 Claims, 15 Drawing Sheets

(51) Int. Cl.
*H04W 64/00* (2009.01)
*H04W 4/22* (2009.01)
*H04B 1/3816* (2015.01)
*H04W 4/14* (2009.01)
*H04L 29/08* (2006.01)
*G06F 17/30* (2006.01)
*G06F 21/44* (2013.01)
*H04L 29/06* (2006.01)
*H04W 12/06* (2009.01)
*H04N 21/81* (2011.01)
*H04N 21/643* (2011.01)
*G06Q 30/02* (2012.01)

(52) U.S. Cl.
CPC ........ *G06F 17/30368* (2013.01); *G06F 21/44* (2013.01); *H04B 1/3816* (2013.01); *H04L 41/12* (2013.01); *H04L 63/08* (2013.01); *H04L 67/02* (2013.01); *H04L 67/26* (2013.01); *H04N 21/64322* (2013.01); *H04N 21/812* (2013.01); *H04W 4/14* (2013.01); *H04W 4/22* (2013.01); *H04W 12/06* (2013.01); *H04W 64/003* (2013.01); *G06Q 30/0267* (2013.01)

(58) Field of Classification Search
CPC ............... H04H 20/57; H04H 2201/13; H04H 2201/33; H04H 60/21; H04H 60/23
USPC ..... 455/3.01, 3.06, 414.1–414.4, 412.1, 466, 455/426.1, 426.2, 406, 405, 407, 408, 455/410, 411, 500, 517, 445, 509, 450, 455/566, 550.1, 507, 515; 725/61, 63, 725/68, 70, 72
See application file for complete search history.

FIG. 6

| Mode of Delivery | Content | Devices | Additional Appendages |
|---|---|---|---|
| CBC/GPRS/ HSPA/ SMS/MMS/ WiFi/Satellite/ other Radio or Cable data connection | Image | All Communication devices available in the market existing and forth coming | (Utilization of Data modems or dongles). Data modems or dongles, commonly available can also be embedded or connected to any kind of Monitor Screen or output module- thus allowing such mediums to display advertisements and/or Rich Media Content and/or Clips and/or videos- which are sent via Modes of Delivery mentioned in this table. |
| CBC/GPRS/ HSPA/ SMS/MMS/ WiFi/Satellite/ other Radio or Cable data connection | Text | All Communication devices available in the market existing and forth coming | |
| CBC/GPRS/ HSPA/ SMS/MMS/ WiFi/Satellite/ other Radio or Cable data connection | Video/ Animation | All Communication devices available in the market existing and forth coming | |

FIG. 10

METHOD AND SYSTEM FOR TRANSMITTING AND/OR RECEIVING ADVERTISEMENT AND DATA CONTENTS AND PROVIDING MULTIPLE VALUE ADDED SERVICES ON ELECTRONIC COMMUNICATION DEVICE WITH A DISPLAY MECHANISM

CROSS REFERENCE TO RELATED APPLICATIONS

This application is a continuation in part of U.S. application Ser. No. 13/027,301, filed on Feb. 15, 2011.

BACKGROUND

Technical field

The embodiments herein generally relate to communication systems and methods and particularly relates to sending and/or receiving advertisements and data content and providing multiple value added services for subscribers through electronic communication device. The embodiments herein more particularly relates to a method and system for displaying advertisements or data content on the display screen of the user's mobile communication device and any other Portable/Non Portable Electronic Device with a display mechanism and further for delivering multiple value added services based on user's request using CBS/CBC, SMS, MMS, GPRS, HSPA, WiFi, satellite, radio data connection, cable data connection and any data connection available on the electronic device that is connected to different communication networks including IPTV, Fixed telephony, GSM mobile communication, satellite, CDMA, WCDMA, WiMAX, LTE, Advanced LTE, UMTS, 4G network, GPON, WiFi, and the like communication networks.

Description of the Related Art

The recent reports indicate that over 300,000 mobile apps have been developed in three years. Apps have been downloaded 10.9 billion times. But demand for downloading mobile apps is expected to peak in 2013. Analysts have predicted an exponential growth for the use of mobile devices applications which has made business owners, both small and large, take notice. As a result, a lot of marketers worldwide have decided to spend more on mobile devices applications development. Furthermore, the recent reports on mobile advertising indicate that mobile advertising, as an advertising medium, is becoming a mainstream phenomenon around the world. Nearly 35% of the mobile users in the U.S. got advertisements on their mobile device during the fourth quarter of 2008. Many users who receive the mobile advertisements are likely to respond to the advertisement depending on their age group and other requirements.

In the field of telecommunications, the mobile devices are increasingly used for more than simple voice and text communication. The mobile devices are now becoming the users' personal center of operations capable of performing complex operations, delivering services from numerous service providers through tailored applications, reading the Global Positioning System (GPS) signal using integrated GPS module in the mobile devices and displaying various forms of content including interactive static, animated, video images, audio files, web/WAP (Wireless Access Protocol) pages, or combinations of these forms. A growing number of solution providers, content providers, and advertisers are providing their solutions and content through applications installed on mobile, portable, and non portable electronic devices; Applications that include mobile payments, banking, and commerce tools, marketing and retail tools, ticketing, advertising, social networking, content providing applications, gaming, location services and maps.

Also, in today's trend advertising and information sharing has been more than a marginal influence on patterns of sales and production. Technology has supported this in a large way for promoting products and services and to reach customers efficiently. However advertisements and product information very often does not reach customers at the right place and time.

The content available through mobile devices is often difficult to be accessed and previewed before downloading or purchasing. Indeed, most content need to be advertised or marketed in some form to the consumer, and listed in a catalog, deck or file for the consumer to access and download. Also often the content downloaded cannot be rendered or played with the native media applications available in the handset. In other cases content advertised may not be precisely focused and targeted to the right audience. Furthermore, different services like mobile banking, transportation ordering, event specific applications usually require the user to download different application for each service which imposes a challenge for the user's device available system resources like memory, processing power, and battery life as well as increase the complexity of the user experience.

Hence there exists a need for a system and method for enabling the merchants and service providers to broadcast the advertisements and other data content effectively to reach the intended customers with the right profile, interest, location, and device capability without any time delay. There also exists a need to provide a system and method that can host multiple key value added services in a single application and enables customers to interact and access the received content and services with a minimal effort.

The abovementioned shortcomings, disadvantages and problems are addressed herein and which will be understood by reading and studying the following specification.

OBJECTS OF THE EMBODIMENTS

The primary object of the embodiments herein is to provide a method and system for advertising, delivering content, and providing multiple value added user services on the user's communication device.

Another object of the embodiments herein is to provide a flexible mode of advertising through the display screen of the mobile communication device.

Yet another object of the embodiments herein is to provide a method and system for advertising with an ability to profile network users according to user categories based on location, interest, gender, age, nationality, and language to advertise the content according to the user defined preferences.

Yet another object of the embodiments herein is to provide a method and system with an ability to control the delivered contents by minimizing the content to appear on part of the screen.

Yet another object of the embodiments herein is to provide a method and system with an ability to control transmission of different content at the same time to different geographical locations covered by the network.

Yet another object of the embodiments herein is to provide a method and system with an ability to control transmission of different content at the same time across the geographical area covered by the network.

Yet another object of the embodiments herein is to provide a method and system with an ability to associate a unique signature for each user that can be used to track user's interactions, provide promotional offers and coupons, and identifies the user interactions to update the user profile and to generate useful statistics.

These and other objects and advantages of the embodiments herein will become readily apparent from the following detailed description taken in conjunction with the accompanying drawings.

SUMMARY

The various embodiments herein provide a system and method for broadcasting personalized content and advertisements and for providing multiple value added services such as emergency vehicle request, taxi cab request, delivery request, and event organization application through a single application installed in a user electronic device that is connected to a communication network. The system comprises of one or more Application Server that provides business logic and processes to all requests; one or more Application Programmable Interface Server that integrate with content delivery platform systems in a communication network such as Cell Broadcast System, multimedia broadcast multicast system, IPTV, SMSC, MMSC; one or more Community Server that integrate with service provider servers at emergency response centers, transportation centers, and hospitals to send subscriber service request to these centers; one or more Web Server where all connections and requests terminate and which forwards all requests to the application server; one or more Database Server that store subscribers profiles; one or more Statistics Server that generate rich reports and statistics of usage and subscribers' interactions; one or more Administration Server which administrations can use to upload, schedule, plan, and provision content and services and view logs of all transactions performed in the system, The system is used locally as well as remotely by independent Content Providers to define and submit delivery schedule of Messages/Advertisements and can be used by administrators to configure and provision service to become available for subscribers at the application installed in their electronic devices. The system further comprise of software application that is installed on the communication device for sending and/or receiving content and for utilizing the available value added services.

According to one embodiment herein, the uploading of the content on the portal comprises registering a content provider and/or advertiser with the portal and providing authentication credentials like Login-ID and Password.

According to one embodiment herein, the communication device is at-least one of IPTV, Fixed telephony, GSM mobile communication, satellite, CDMA, WCDMA, WiMAX, LTE, Advanced LTE, UMTS, 4G network, GPON, WiFi, and the like communication networks devices.

According to one embodiment herein, the uploading of the data content is carried out through at least one of a Web server Media Loader, an Application server Media Planner and a Web server Media Webpage through a secured network. The said data content are interactive. The uploaded data content are sorted and saved in the database server of the system.

According to one embodiment herein, the data content are displayed in any of the following areas of the user screen of the communication device which includes at least one of covering the complete display screen, covering a portion of the screen, replacing an operator logo and replacing a background picture. The data content on a touch screen communication devices is linked to a hyperlink and further details of the data content appears once the data content is tapped on the user screen of the communication device.

According to one embodiment herein, the advertisement is sent to a selected users of the network depending on the requirements of at-least one of the user or the advertiser or sent to all the users of the network.

According to one embodiment herein, the method further comprises using directing means to direct the user to additional information related to an advertisement of interest.

According to one embodiment herein, the data content are shuffled based on predetermined intervals of usage.

The embodiments herein further provide a method for sending content on a user screen of a communication device. The method comprising steps of uploading data content to an application server media manager, sending the uploaded data content to one or plurality of communication network content delivery platform systems including but not limited to Cell broadcast, MBMS, SMS, MMS, GPRS, HSPA, IPTV; Transmitting the uploaded data content by the content delivery platform to the said electronic device wherein the computer program on the electronic device listens to the corresponding content delivery platform interface; Receiving user's service request from the computer program on his electronic device, forwarding request of the service to the responsible service center through the community server; Collecting usage and viewing statistics from user's computer program.

According to one embodiment herein, the administrator defines the broadcast areas at-least in geographical terms and abstracting from the topology of a mobile network.

The administrator also defines the timing and frequency of the content transmission by choosing desired spot from interactive dynamic booking schedule.

BRIEF DESCRIPTION OF THE DRAWINGS

The other objects, features and advantages will occur to those skilled in the art from the following description of the preferred embodiments herein and the accompanying drawings in which:

FIG. 6 illustrates an advertiser registration window on the portal of the system, according to one embodiment herein.

FIG. 10 illustrates a table showing possible content deliveries through a data connection module attached/connected to LCD Monitor Screens and all other applicable output modules.

Figure 1:
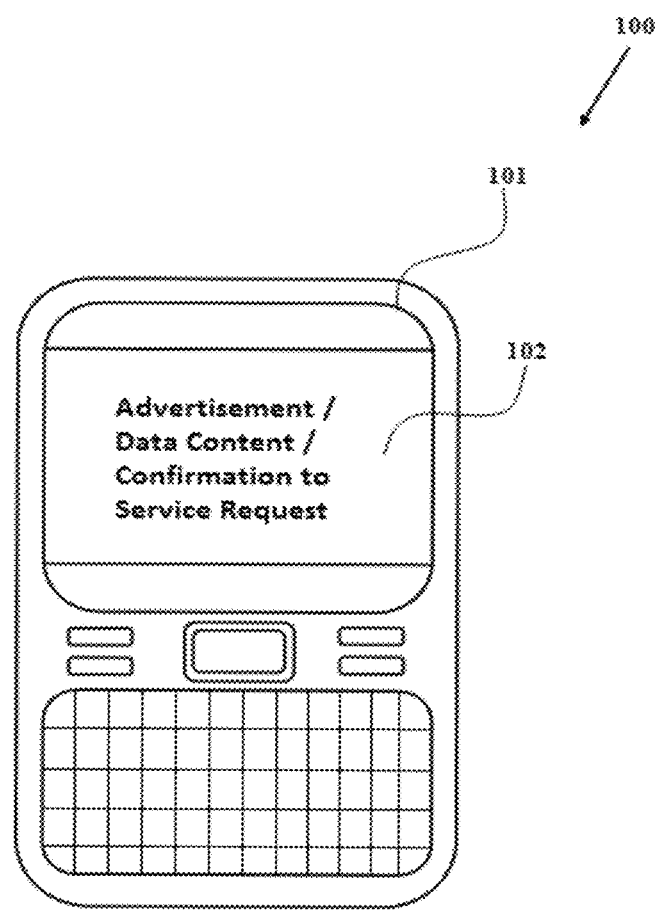
FIG. 1 is an exemplary illustration of a mobile communication device with an advertisement displayed on the user screen, according to one embodiment herein.

Although the specific features of the present invention are shown in some drawings and not in others. This is done for convenience only as each feature may be combined with any or all of the other features in accordance with the embodiments herein.

DETAILED DESCRIPTION OF THE EMBODIMENTS HEREIN

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide a system and method for delivering advertisements/data content on a user screen of a communication device and a system and method for delivering useful services to users through a single software application installed on the user electronic device. The system comprises of one or more Application Server that provides business logic for processing all requests received from subscribers and content providers, it also provides interactive updated booking scheduler, media planner, and media manager that allows content providers to plan, schedule, and submit transmission request for broadcasting campaigns. The application server interfaces with web server for receiving requests and interfaces with community server to send request and receive responses from external service providers and interfaces with application programmable interface server to send requests and receive responses from content delivery platforms in communication network; one or more Application Programmable Interface Server that integrates to and forward requests to end users and receive corresponding responses from content delivery platforms in a communication network such as Cell Broadcast System, multimedia broadcast multicast system, IPTV, SMSC, MMSC; one or more Community Server that integrate with service provider servers at emergency response centers, transportation centers, and hospitals, and other service centers to send subscriber service request to these centers; one or more Web Server where all connections and requests terminate and which forwards all requests to the application server; one or more Database Server that store subscribers profiles; one or more Statistics Server that generate rich reports and statistics of usage and subscribers' interactions; one or more Administration Server which administrations can use to upload, schedule, plan, and provision content and services and view logs of all transactions performed in the system According to one embodiment herein, the uploading of the data content and advertisements on the portal comprises registering a content provider and an advertiser with the portal and providing authentication credentials like Login-ID and Password.

According to one embodiment herein, the communication device is at-least one of IPTV, Fixed telephony, GSM mobile communication, satellite, CDMA, WCDMA, WiMAX, LTE, Advanced LTE, UMTS, 4G network, GPON, WiFi, and the like communication networks devices.

According to one embodiment herein, the uploading of the data content is carried out through at least one of a Web Server media Loader, a Application Server Media Planner and a Web Server Media Webpage through a secured network. The said data content are interactive. The uploaded data content are sorted and saved in a database server of the system.

According to one embodiment herein, the data content are displayed in any of the following areas of the user screen of the communication device which includes at least one of covering the complete display screen, covering a portion of the screen, replacing an operator Logo and replacing a background picture. The data content on a touch screen communication device is linked to a hyperlink and further details of the data content appears once the data content is tapped on the user screen of the communication device. Hyperlinked advertisements once tapped activate data connection such as GPRS, 2.5G, 2.7G (EDGE), 3G or 4G data connection and takes the mobile user to a WAP page.

According to one embodiment herein, the advertisement/data content is sent to a selected users of the network depending on the requirements of at-least one of the user or the advertiser or sent to all the users of the network.

According to one embodiment herein the method further comprising using a directing means to direct the user to additional information related to an advertisement/data content of interest.

According to one embodiment herein, the advertisements/data content are shuffled based on the predetermined intervals of usage. At least one advertisement is then transmitted through a wireless application protocol link to a communication device.

The embodiments herein further provide a method for sending content on a user screen of a communication device. The method comprising steps of uploading data content to an application server media manager, sending the uploaded data content to one or plurality of communication network content delivery platforms including but not limited to Cell broadcast, MBMS, SMS, MMS, GPRS, HSPA, IPTV; Transmitting the uploaded data content by the content delivery platform to the said electronic device wherein the computer program on the electronic device listens to the corresponding content delivery platform interface; Receiving user's service request from the computer program on his electronic device, forwarding request of the service to the responsible service center through the community server; Collecting usage and viewing statistics from user's computer program.

According to one embodiment herein, the administrator defines the broadcast areas at-least in geographical terms and abstracting from the topology of a communication network. The administrator also defines the timing and frequency of the data content by choosing desired spot from interactive updated booking schedule.

FIG. 1 is an exemplary illustration of a mobile communication device with an advertisement or data content or confirmation to service request is displayed on the user screen, according to one embodiment herein. FIG. 1 shows a front view of the mobile handset with an advertisement or data content or confirmation to service request displayed on the display screen. The mode of display 102 on the user screen 101 is flexible as the display of the content is customized based on the user-defined preferences. The content as shown in FIG. 1 is displayed on the user screen 101 of the mobile handset covering the complete screen surface. The content can also be displayed on the user screen 101 in one of the modes including partial coverage of the mobile screen, replacement of the network operator logo with the content and replacing the background image on the mobile screen with the content. The content 102 is shuffled from one content to other at predetermined intervals in accordance with a market or a content provider targets. The content 102 are also shuffled at predetermined intervals depending on the user preferences.

Figure 2:
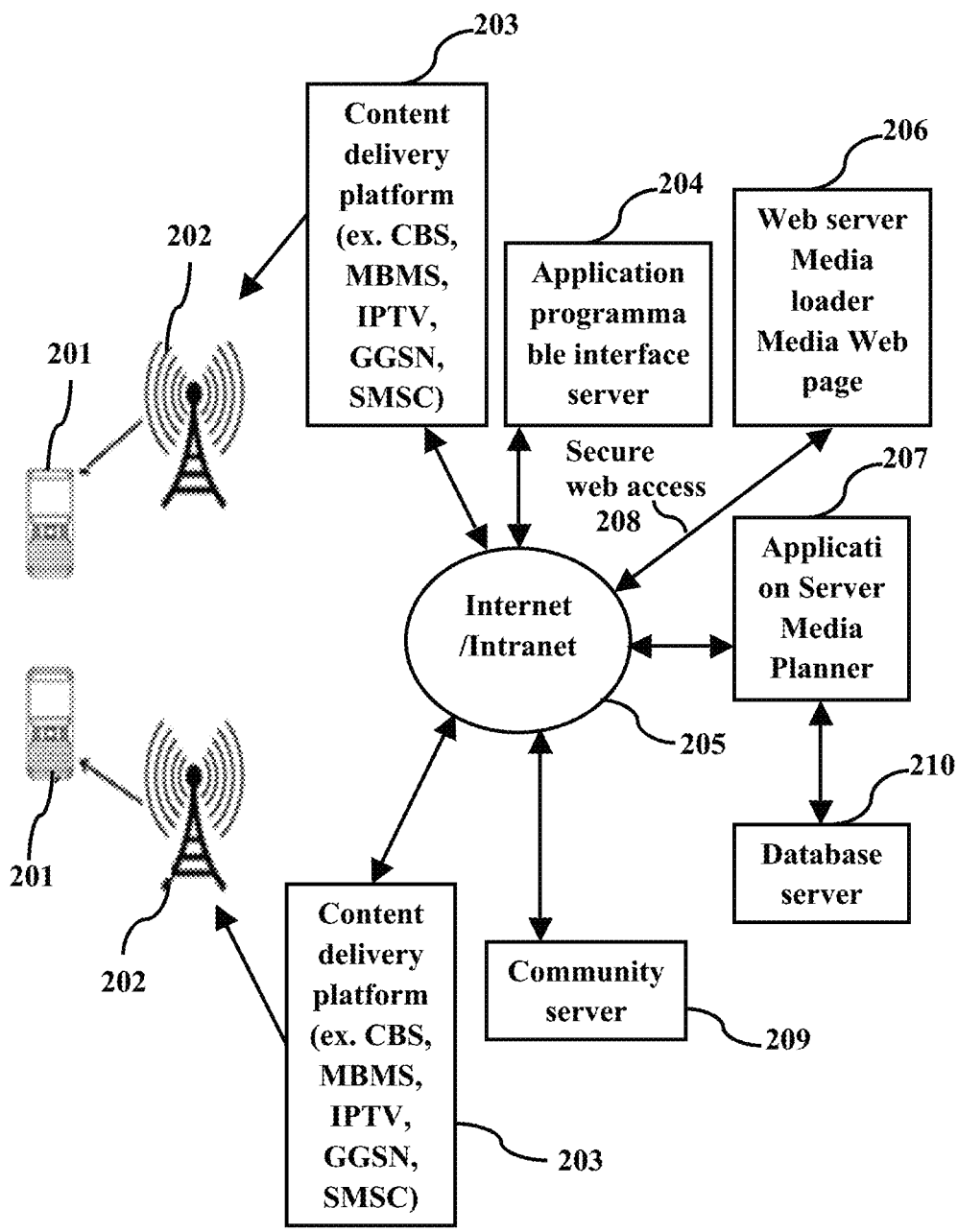
FIG. 2 illustrates a block diagram of the advertisement, data content, and multiple value added service delivery system, according to one embodiment herein.

FIG. 2 illustrates a block diagram of the content delivery and multiple value added services system, according to one embodiment herein. The data content are uploaded from Web Server Media Page and Web Server Media Loader 206, to the Application Server Media Planner 207, through internet/intranet 205 and over a secured web access 208 i.e. with specific ID and password. Once the uploading is completed, the data content are pushed to the content delivery platforms 203 through the Application Programmable Interface Server 204 whereas the data content are sorted and saved in the database server 210. From content delivery platforms, the data content are sent to the users 201 in any desired form as requested by the content provider and according to market targets by utilizing data transport network 202. Furthermore, the application server can forward user requests for services such as taxi cab order or emergency response request, or medical record update to the concerned service provider through the community server 209 and receives back the response or confirmation and update the user accordingly.

Figure 3:
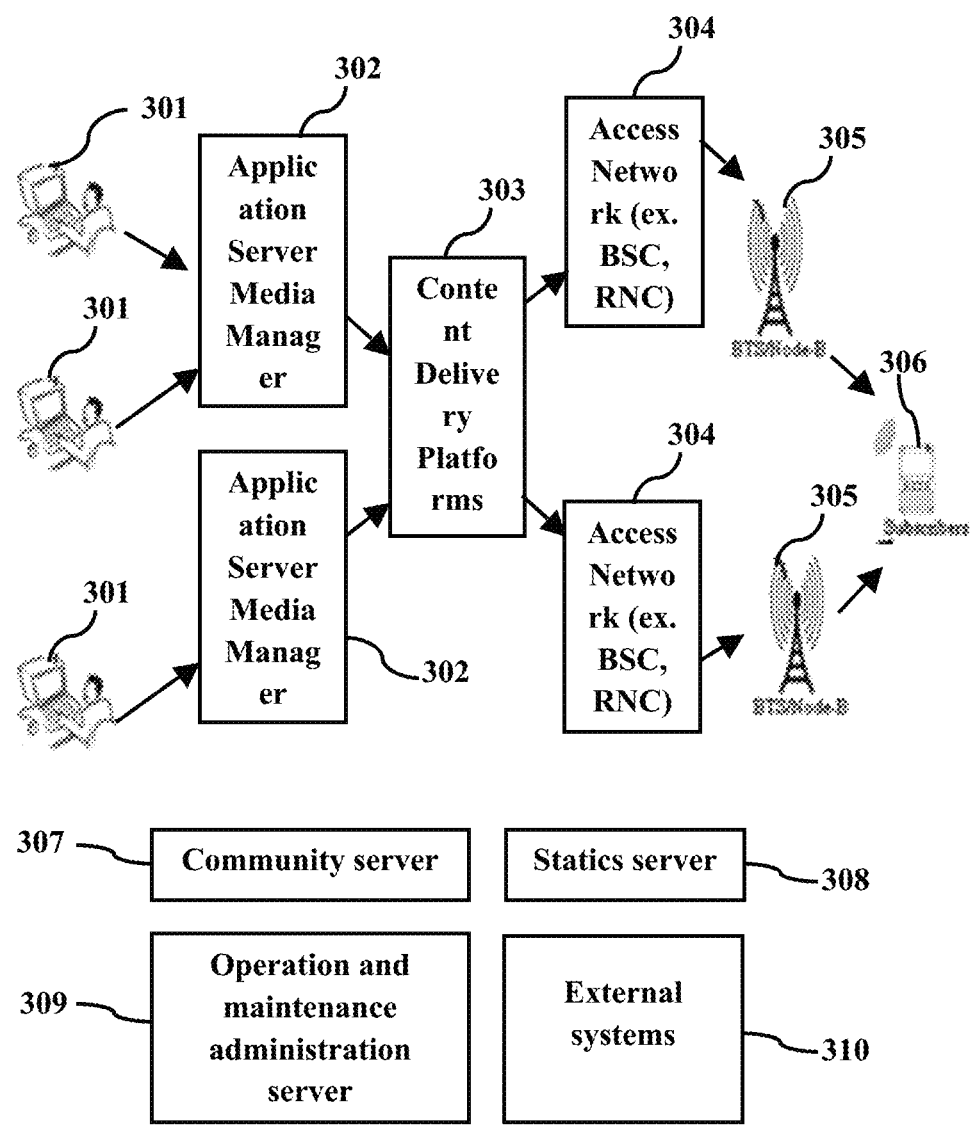
FIG. 3 illustrates a block diagram of the advertisement, data content, and multiple value added service delivery system, according to one embodiment herein.

FIG. 3 illustrates a block diagram of the content sending and receiving and multiple value added services provision system, according to one embodiment herein. The system includes one or more Administration Servers users 301 connected to a content delivery platform (such as CBS, MBMS, SMSC, IPTV.) 303 through Application Server media manager 302. The Administration Server user 301 defines and submits data content both locally as well as remotely where the Administration Server user can be independent Content Provider or advertiser. The Administration Server user 301 defines the broadcast areas in geographical terms, abstracting from the topology of the mobile network. The Administration Server user 301 also defines the timing and frequency of transmission of the content delivery platform 303 message, also termed as data content such as advertisement.

The Application Server media manager 302 aggregates and processes the content data received from all the Administration Server users 301 or content providers. Then the Application server media manager 302 forwards the requests to the content delivery platforms 303. To execute the commands received from the Application Server Media Manager 302, the content delivery platform addresses the appropriate Access Network component such as Base Station Controllers (BSC) 304. The commands to the Access Network 304 are given with targeted cells details based on the topology information and on the targeted geographical areas. The requests are processed by the content delivery platform 303 and standard compliant commands are sent to the Access Network 304.

The content delivery platform 303 is addressed by the content providers using an Application Server Media Manager module 302 through application programmable interface server. The requests are processed by the content delivery platform 303, and standard compliant commands are sent to the Access Network 304.

The system is managed by a management module from the Operation and Maintenance Administration Server 309. The Statistics Server 308 also provides Statistics information regarding the Application Server Media Manager 302 requests. The Application Server 302 also forwards request to external systems 310 that belong to service providers through the community server 307.

Each connection to a content provider is provided with a defined time span, when no transmission occurs on a link within the specified time-span the Application Server Media Manager 302 terminates the connection.

The Application Server Media Manager 302 is connected to the Content Delivery Platforms 303 through the Local Area Network (intranet) or the Internet. In the Content Delivery Platforms 303, throughput regulation is performed for the data received from the Application Server Media Manager. When the Application Server-Media Manager 302 exceeds a configurable maximum throughput; the Content Delivery Platforms 303 slows down the rate of sending the response. This increases the probability of reaching the window size configured per content providers and prevents sending additional requests.

Figure 4:
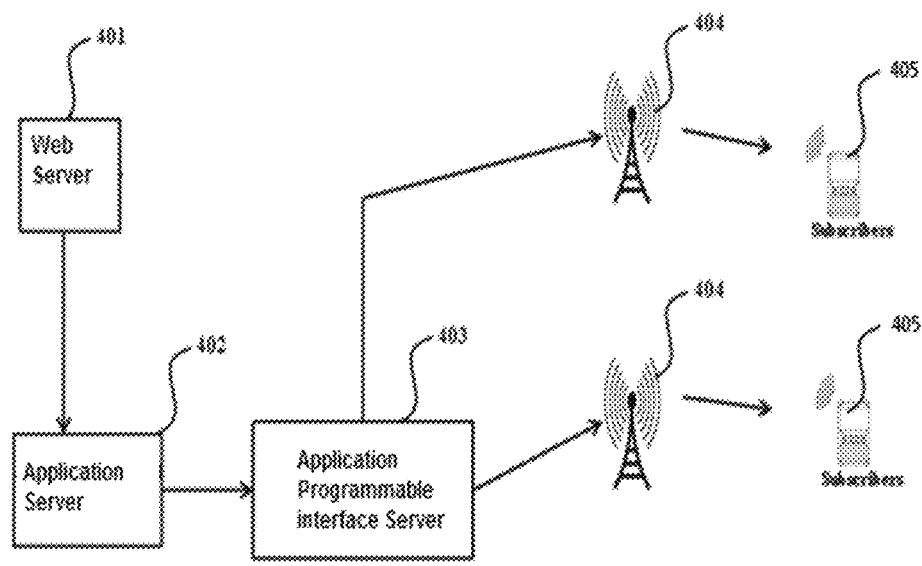
FIG. 4 illustrates a functional block diagram of the advertising/data content delivery system, according to one embodiment herein.

FIG. 4 illustrates a block diagram of the content sending and receiving and multiple value added services provision system, according to one embodiment herein the Web Server 401 forwards the data content to the Application Server 402. The Application Server 402 forwards the data content to the Application Programmable Interface Server 403 that sends the data to the transport network 404. In case the size of the data content is large and cannot be carried with standard messages of the transport network such as the case with Cell Broadcasting System (CBS), the Application Programmable Interface Server manipulates data content before sending it to the transport network 404 by reducing the data to chunks, each chunk containing approximately 1120 bytes of data and approximately 100 bytes of header. For example, commands like play a stored advertisement, delete a stored message is also sent to the Application Programmable interface Server 403. The header contains details of the application signature, message-ID (a unique identifier of the message), message type including text, image, ring-tone and the like, message category including advertisement, traffic situation, emergency messages, total number of chunks, size of the current chunk, sequence of the current chunk and the display attributes such as size, position, orientation and the like. In case of mobile cell broadcasting system (CBS) platform the data contains approximately 1120 bytes if it is binary and approximately 1250 bytes of data if the message is broadcasted as text. The data is then sent to the cell broadcasting transport network 404 and the content is sent to the subscribers 405.

The messages received from the application server may reach in a different order from the original order in which the messages are transmitted. In such cases the system uses a mechanism of adding chunk sequence number so that while concatenating the data client application avoids errors. The chunks from different contents do not interfere since the system maintains a unique ID for each of the chunk sent. In case the communication is happening in one way, the chunks for incomplete messages are deleted after waiting for a predetermined time period in case if incomplete data is sent to the client system.

The data content is encapsulated and is then encrypted with a symmetric key. The encrypted output is used as a signature. The user is provided with an option to activate or deactivate the channel for receiving data content. Data content is sent as binary data. The binary data is encrypted-decrypted for subscribed services. The broadcasted data content are encrypted prior to being communicated to the communication devices within a geographic area. When the communication device receives the encrypted broadcast messages, the software application in the communication device retrieves a cryptographic key, which is stored in the communication device to decrypt the message and the information contained in the decrypted message is processed and displayed.

Figure 5:
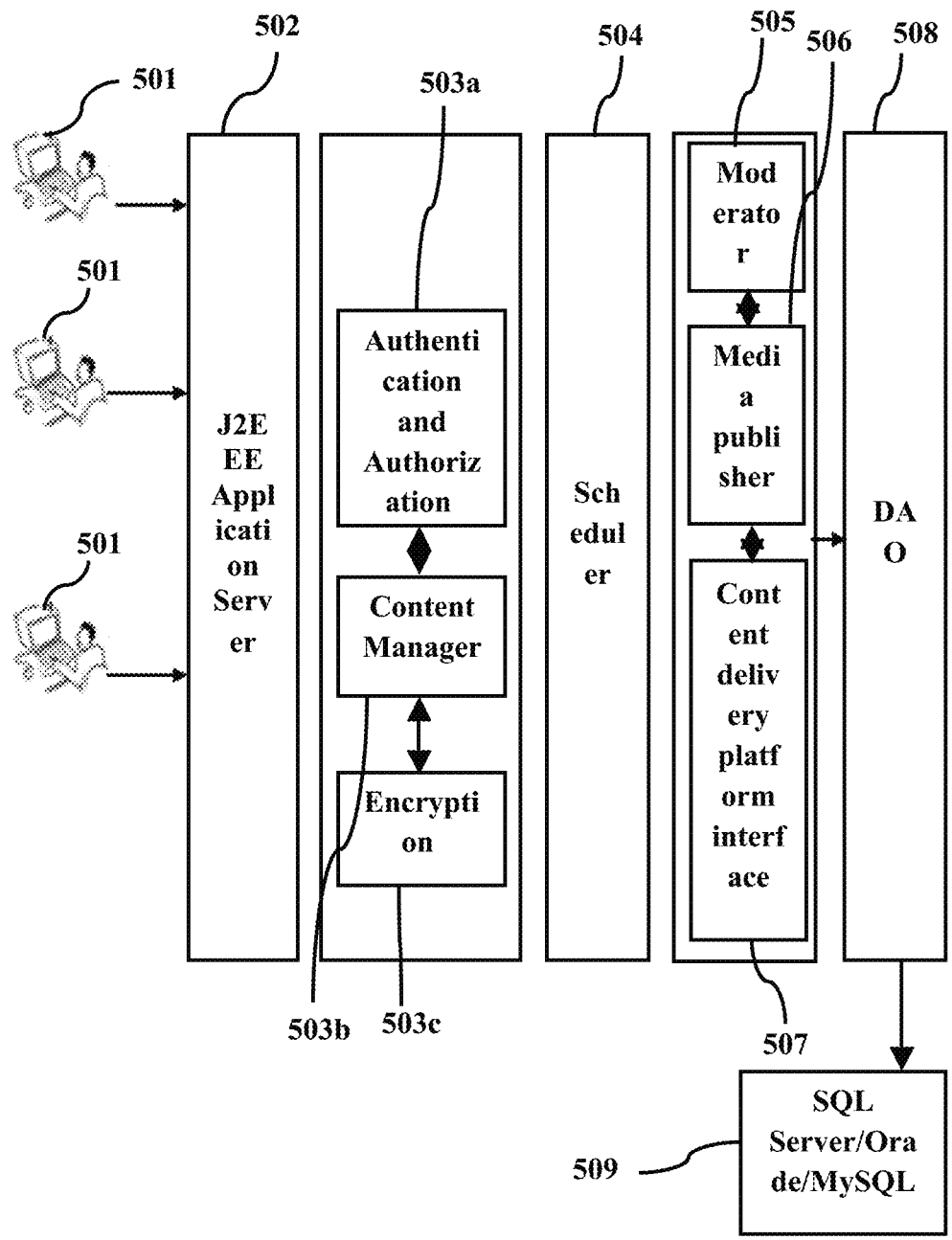
FIG. 5 illustrates a block diagram of a configuration manager/web interface sequence in the advertisement/content delivery system, according to one embodiment herein.

FIG. 5 illustrates a block diagram of configuration manager/web interface sequence of the system, according to one embodiment herein. The configuration manager/web interface enables content providers who have subscribed for the service to login into the system and schedule and publish the advertisements and messages. The application consists of modules to schedule and upload advertisements and messages, re-schedule and set configuration parameters of the advertisement. The advertiser/web user 501 connects to the web server 503 through a J2EE application server 502. A J2EE application server 502 is a software framework dedicated to the efficient execution of procedures (programs, routines, scripts) for supporting the construction of applications. The advertiser/web user 501 is authenticated and authorized 503a with the login ID and password before connecting to the web interface. Once the authentication and authorization 503a is done, the advertiser/web user 501 is allowed to upload and schedule advertisements and messages, re-schedule and set configuration parameters of the advertisement and messages. The web server 503 consists of a content manager 503b, which reviews and filter-out contents before publishing them. This ensures that no offensive contents with swear words are transmitted to the mobile device.

The uploaded advertisement and data content is then encrypted with the encryption 503c algorithm. The scheduler module 504 allows the advertiser/web user 501 to schedule the advertisement, re-schedule the scheduled advertisement and set configuration parameters of the advertisement. The moderator 505 module modulates the entire process of scheduling, uploading advertisements and messages, re-scheduling and setting configuration parameters of the advertisement and allows the administrator to review and filter-out contents before publishing. Once the administrator reviews the uploaded advertisements and messages, the media publisher 506 publishes the advertisements. The scheduler 504 module then processes the messages based on the schedule set by the advertiser/web user 501 and the administrator and sends the data to a Content Delivery Platform Interface 507. The Content Delivery Platform Interface 507 broadcasts the message. The Data Access Objects (DAO) 508 is a general programming interface for accessing the SQL server database 509. The data access object (DAO) 508 provides an abstract interface to the SQL server database 509 for specific operations without exposing details of the SQL server database 509.

The advertisers/web user 501 use the configuration manager to set parameters for the advertisement such as managing files (memory management) on the device, playing schedule, image position, orientation, size and the like, which forms the header for the message. The expiry of the content is also as part of header for removing the file after receiving or after a certain period of time unless the subscriber wishes to store the message.

The configuration manager also allows the users to upload images and allows to type in text messages. While uploading the application, based on the mode of display such as banner, full screen and the like, the server resizes the image into a pre-defined format, which does not make any distortion on different screen resolutions in mobile end while viewing. The administrator of the configuration manager/web interface has the privilege to use the configuration and schedule modules. The administrator enrolls the advertisers/web users 501 and set privileges according to the preferences, uploads the content (Images/video, audio, text messages, and choose the area for message broadcasting. The user is selected from one or more ways including targeting users under specific Cell IDs that can be selected from a list, or by using maps and/or entering the geographical coordinates and the like, where the Application Server can read the coordinates of the user device and target user based on their location according to the preferences for the location. The administrator also has the privilege for the maintaining the cell management module such as cells location creation, and to reject or filter the added advertisement according to the country rules and regulations with prior coordination with the content provider.

Similarly, the advertiser/web user 501 can upload the content or post messages in the mobile advertisement system taking in consideration the agreed rules and restrictions, schedule and configure advertisement and uploaded messages.

Figure 6:
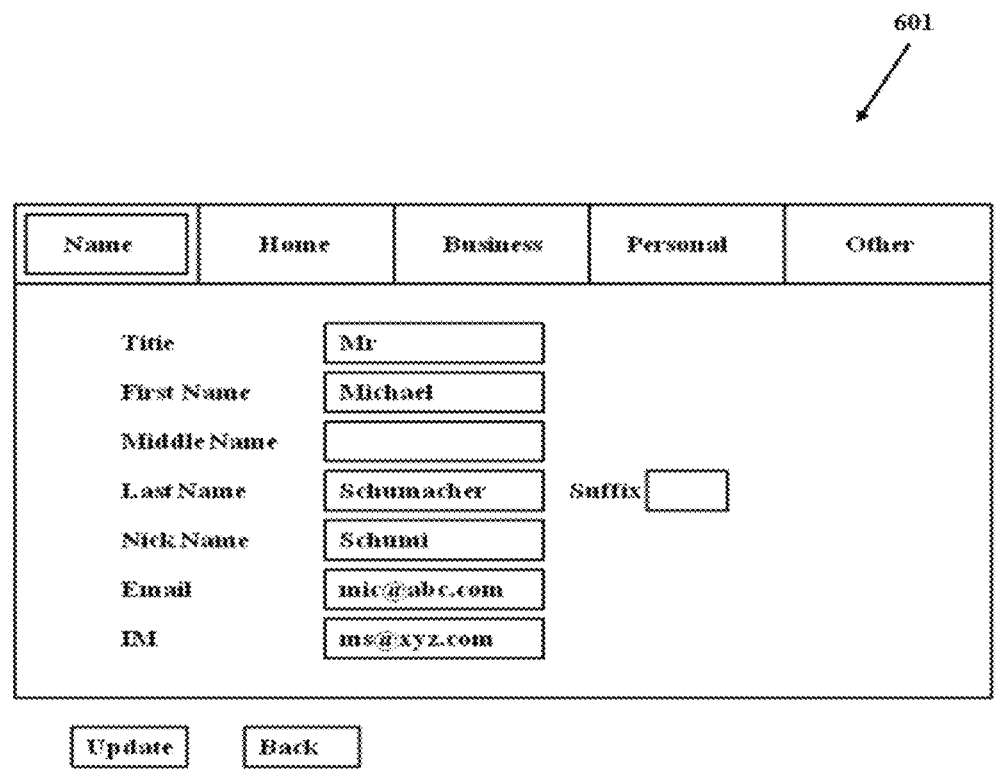

FIG. 6 illustrates an advertiser registration window on the portal of the mobile advertising system, according to one embodiment herein. The advertiser fills in the boxes with the necessary details provided in the advertiser registration window 601 on the portal of the mobile advertising system. Once the details of the advertiser are updated in the portal, the advertiser is provided with authentication credentials including a login ID and password. The advertiser can also define the authentication credentials according to their preferences. Once the advertiser is authenticated, the advertisers are allowed to upload and schedule the advertisements and messages.

Figure 7:
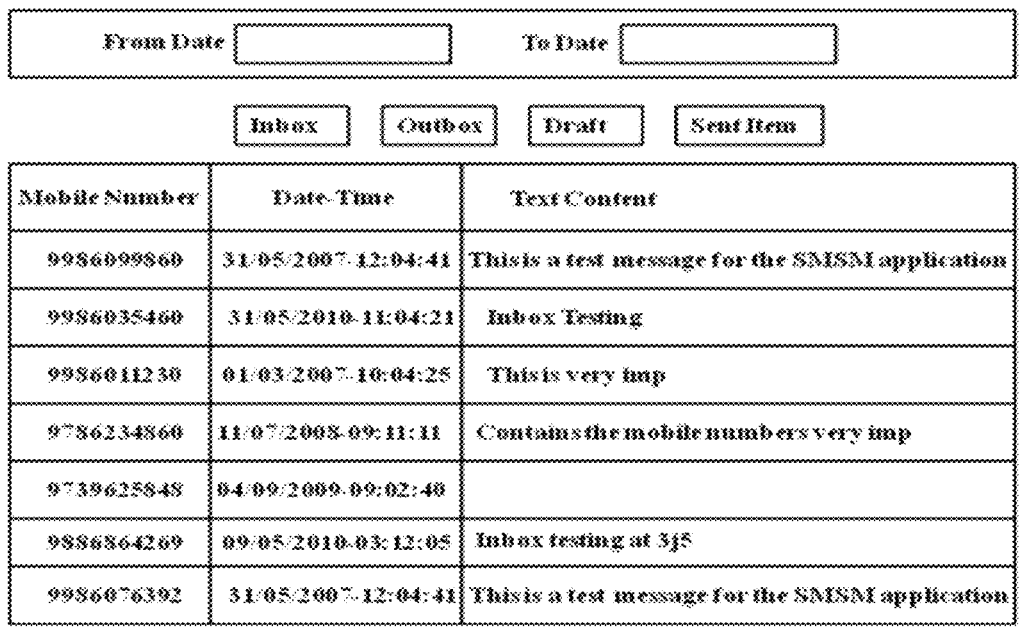
FIG. 7 illustrates an administration server's ad-publisher window for consolidating the advertisements/content and transmitting the relevant advertisements/content and messages to the users, according to one embodiment herein.

FIG. 7 illustrates the Application Server media server's publisher window for consolidating the data content and transmitting the relevant advertisements and messages to the communication devices, according to one embodiment herein. The broadcast media server's publisher window 701 allows the content provider to schedule and upload advertisements and messages, re-schedule and set configuration parameters for the data content. The scheduler 504 module as shown in FIG. 5 then processes the data based on the schedule set by the advertiser/web user and the administrator and sends the data to a Content Delivery Platform Interface. The moderator module modulates the entire process of scheduling, uploading advertisements and messages, re-scheduling and setting configuration parameters of the data content and allows the administrator to review and filter-out contents before publishing them. Once the administrator reviews the advertisements, the media publisher publishes the advertisement and messages according to the configuration parameters set by the advertiser.

Figure 8:
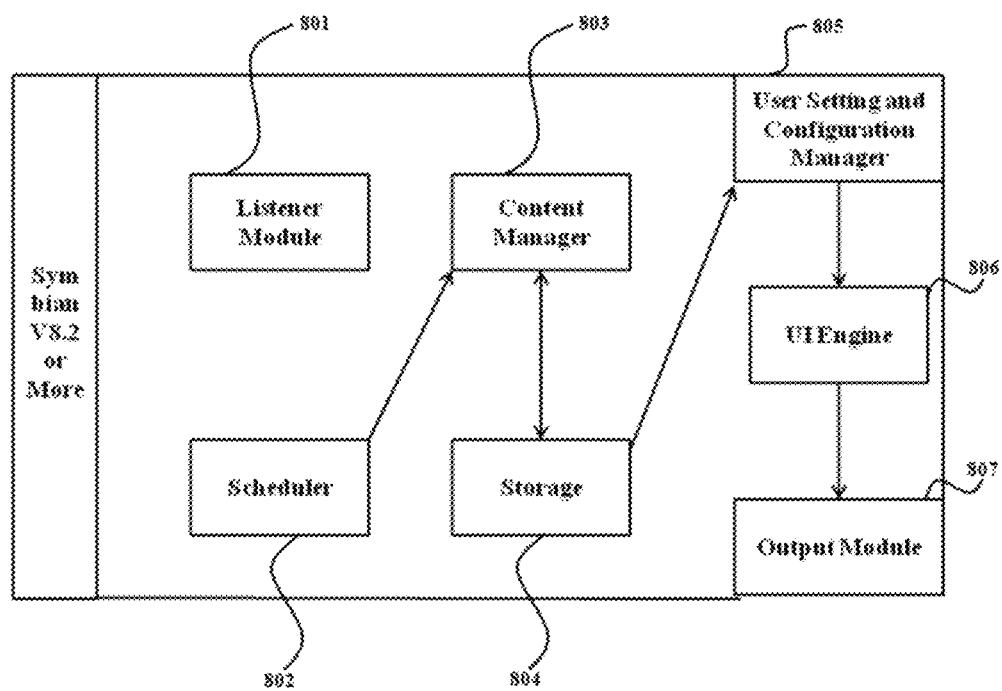
FIG. 8 illustrates a block diagram system for advertising on the mobile main screen, according to one embodiment herein.

FIG. 8 illustrates a block diagram of the method and system for sending and/or receiving data content and providing multiple value added services on the communication device, according to one embodiment herein. The listener module client 801 runs at the background on the communication device, for instance a mobile device, to listen a specified port number. Whenever a new message is received, the listener module client 801 invokes the content manager's (803) main method. The scheduler 802 invokes the content manager 803 at periodical intervals and the content manager 803 displays the stored messages if they have to be displayed on a schedule. The content manager 803 decodes/merges the message to its original format according to the user defined protocol and stores the message on to a storage device. The storage area is a multimedia card (MMC), and data is stored in 2d file in a format: ContentReceived :<users define protocol><data >.

The storage area 804 is split into two portions, where the first portion is a permanent storage area and the second portion is a temporary storage area. The data that has to be kept for a defined period of time in the device's memory is stored in the permanent area. The data stored in the temporary storage area will be displayed immediately and will be deleted automatically after the user views the message.

The content is compressed and encoded before sending to the mobile device. The mobile device receives the advertisements and messages as bits and pieces as the contents may be more than the specified length per chunk, as the data content may be large in size. The data received is decoded and merged before the data is stored in the storage area 804.

The messages are generally identified by content-id. The content-id is same for all chunks. After receiving all the chunks of the data, the content manager 803 stores the data in file system database and invokes the configure manager 805. This in turn displays the advertisements and messages. A user settings and the configuration manager 805 stores a protocol, a message index, a message type and a TTL (Time to live) in a local module. According to that, the configuration manager sends an instruction to a UI engine 806 about what to display, where to display and which data to be stored and deleted. The UI engine 806 formats the message as per the UI Configuration, the mobile device compatibilities and screen resolutions, and displays the output through the output module 807.

The software application on the communication device selects either the phone memory or external memory to store the content and images received. The usage of memory is purely dependent on the content and duration the message needs to be broadcasted.

The communication device users are provided with configuration options for the application including:
  a) deactivating the software application where the software application does not run at all, and does not receive any messages;
  b) categorizing the messages such as emergency messages, traffic alerts, general advertisements and filters are set based on the message categories using keywords;
  c) setting ringtone according to the message type;
  d) setting image size of the message, to fit to the actual screen size of the user communication device;
  e) defining the volume of data that can be stored on the phone;
  f) storing the data as per the unique Message ID sent by the server such that there is over writing of data;
  g) updating an account to LRU (least recently used);
  h) updating according to command sent from the server (expire content, delete advertisement);
  i) deleting old data which are least used by the software application, in case of memory full;
  j) alternatively using data connection such as GPRS, 2.5G, 2.75G (EDGE), 3G, or 4G, WiMAX, LTE, GPON data connections and the like for receiving data content and sending responses.

Figure 9A:
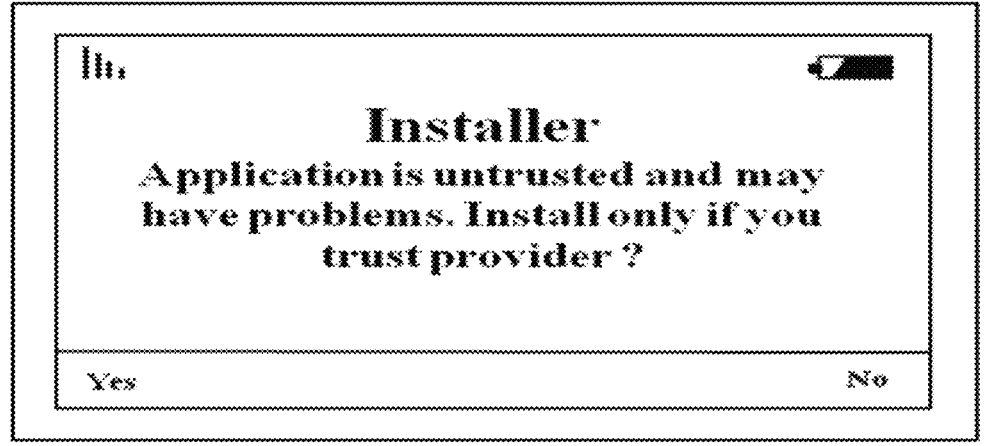
FIG. 9A-9F illustrates a step-by-step installation of the electronic device software application, according to one embodiment herein.

FIG. 9A-9F illustrates the step-by-step installation of the software application, according to one embodiment herein. The software application URL is sent via a configuration message to the mobile device. The configuration message contains information which establishes and downloads the application from a remote server. The details include name and web address [URL]. Alternatively the user can download the software package from repository or application store. The installation wizard opens when the installation starts in the mobile device. In the first step 901, the security warning stating the application is un-trusted message pops as shown in FIG. 9A. If the mobile device user selects "Yes" the application proceeds to the next installation step. If the user selects "No" the installation stops.

Figure 9B:
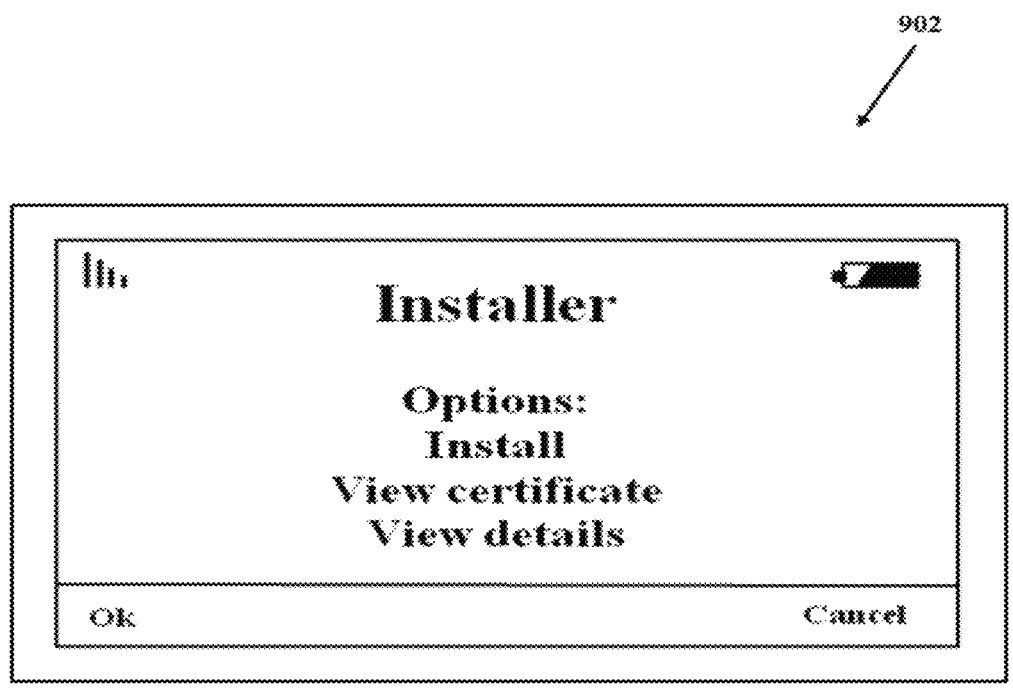

In the second step 902 of the installation, the mobile device user is provided with three options as shown in FIG. 9B. Install-for continuing the installation procedure, view certificate-includes the version number, the certificate and the application developer details and view details-includes the details like size of the mobile application, receiving time and date, application format etc. upon selecting the option install, the mobile application leads to the next step.

Figure 9C:
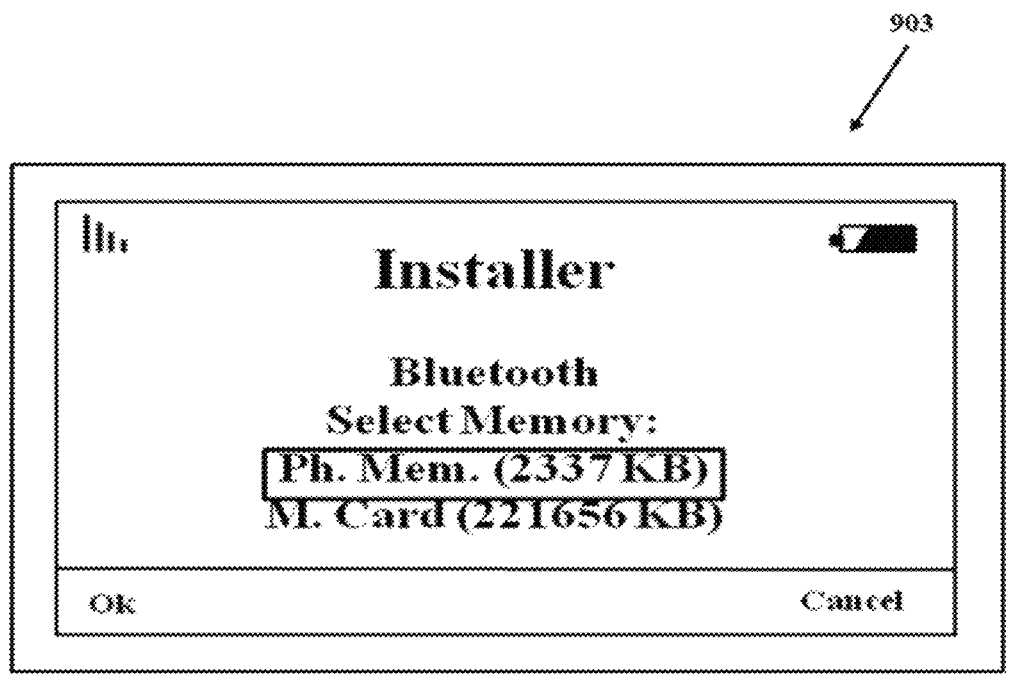

In the third step 903, the communication device user has to select the storage area to install the application as shown in FIG. 9C. The storage area consists of phone memory and the multimedia card. A free space of the phone memory and the multimedia card are also displayed on the mobile screen. The user can select either of the storage area to install the software application depending upon the free space. After selecting the storage area, the software application leads to the next step.

Figure 9D:
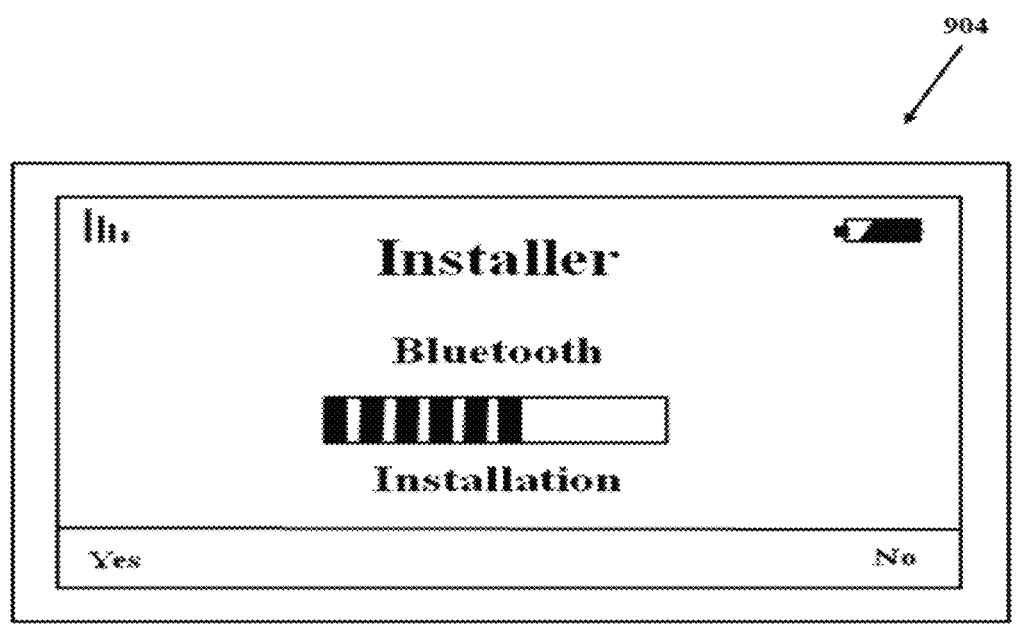

In the fourth step 904, the installation progress is displayed on the mobile device screen as shown in FIG. 9D.

Figure 9E:
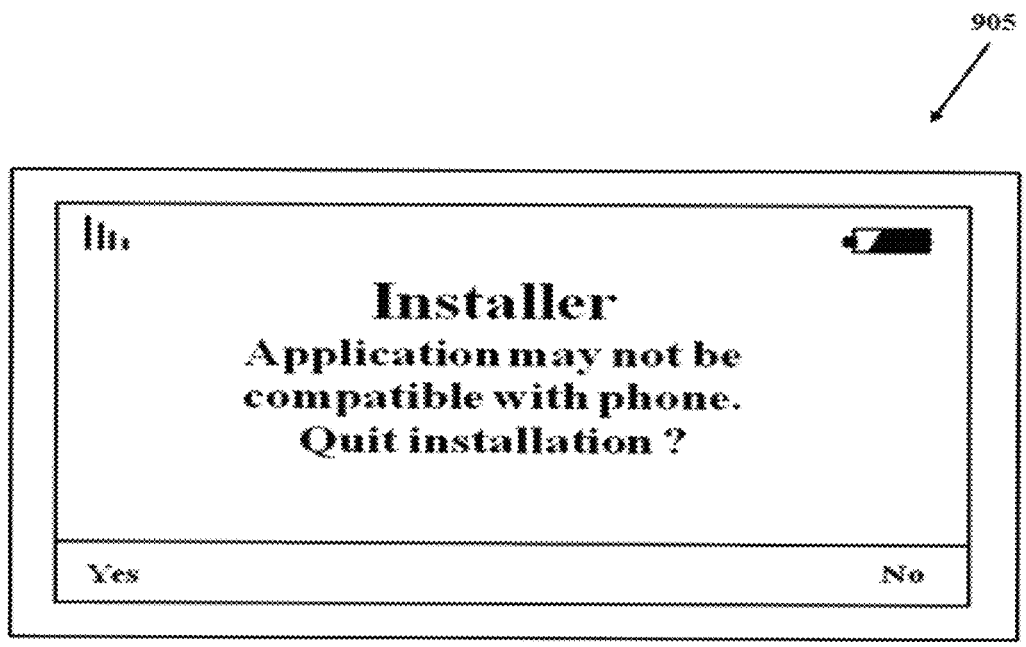

If the software application is not compatible with the mobile device 905, the installer pops the message; application not compatible with phone and quit installation as shown in FIG. 9E. In case the user selects "No", the installer installs the application, but the application no longer works. If the user selects "Yes", the installer stops installation and quits from the installation wizard.

Figure 9F:
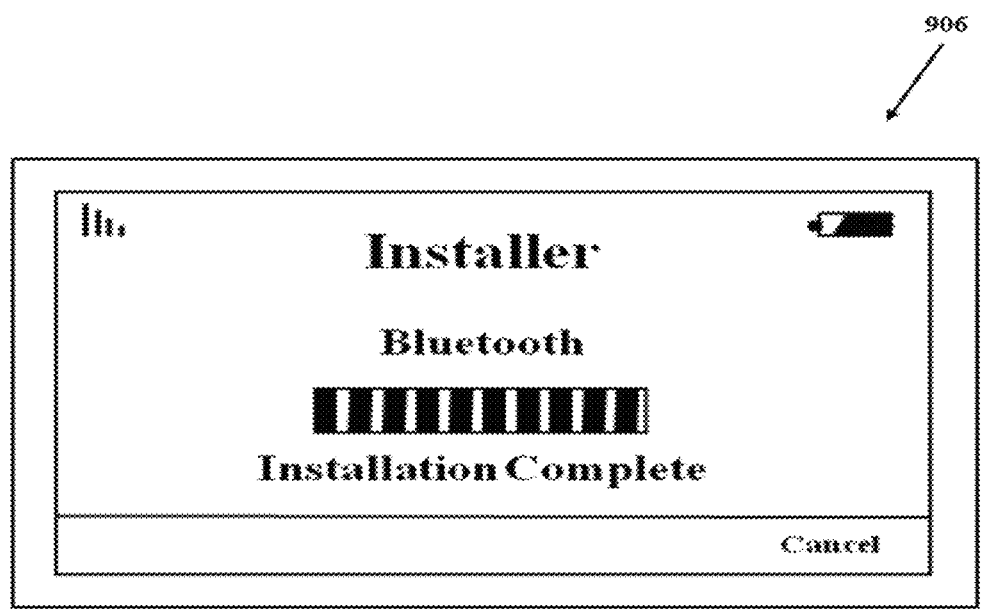

In the fifth step 906 as shown in FIG. 9F the software application installs successfully in the mobile device if the software application is compatible with the communication device and the installation complete: message is displayed on the mobile device screen.

According to one embodiment herein users can request multiple services from application installed on their electronic devices which provides multiple value added services to users. Service can be request for Taxi cab, emergency response vehicle, delivery also service can be receiving instructions during events from event organizer, or performing monetary transactions. In one scenario the user requests a taxi cab from the mobile application the request goes to the application server. The application server attaches the user location and id and forwards the request to the community server which forwards the request to the nearest taxi group based on the locations of the user and the taxi group, where the Taxi group would also be having another mobile application one taxi picks up the request and upon the arrival of the taxi to requested location he can send a message to the user requesting the service about his arrival. In another scenario the user can request for emergency response vehicle such Ambulance or firefighting cars, in which case the application server attaches the user medical profile to the request going to the community server and to the service provider. In another scenario the user attaches a dongle that performs blood specimen analysis and generates data to the user electronic device where the mobile application installed on the user electronic device can forward all the readings to user's clinic. In another scenario the user participating in events can receive instructions from event organizers or can be tracked by event organizers. In another the Application Server can create account for each user which the user can transfer payment to through credit card. The user can then use his mobile application as a wallet and make payments to retails who participate in this service and can receive payments through commands initiated from the application.

FIG. 10 (Utilization of data modems or dongles). data modems or dongles can also be embedded or connected to any kind of Monitor Screen or output module-thus allowing such mediums to display advertisements and/or Rich Media Content and/or Clips and/or videos, which are sent via CBS and/or data connection such as GPRS, 2.5G, 2.75G (EDGE), 3G, or 4G, WiMAX, LTE, GPON data connections and the like.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

Although the embodiments herein are described with various specific embodiments, it will be obvious for a person skilled in the art to practice the embodiments herein with modifications. However, all such modifications are deemed to be within the scope of the claims.

It is also to be understood that the following claims are intended to cover all of the generic and specific features of the embodiments described herein and all the statements of the scope of the embodiments, which as a matter of language might be said to fall there between.

We claim:

1. A system for transmitting and/or receiving a data content on an electronic device connected to a communication network in broadcast, multicast, and Unicast mode comprising:

a cell broadcast manager to receive the data content from a plurality of cell broadcast entities;

a cell broadcast system to store the data content transmitted by the cell broadcast manager and shuffling the data content based on predetermined intervals of usage;

a plurality of base station controllers comprising GPRS methodology;

a cell broadcast center (CBC) to address an appropriate base station controller for processing requests;

wherein the electronic device installed with a CBC application for providing a plurality of value added services;

a web server hosting a portal and logic that receives at least one request from at least one user and at least one data content provider, and wherein the web server forwards at least one request to an application server;

wherein the web server receives said at least one request from the at least one user and the at least one data content provider from the web server and wherein the application server provides a business logic, billing, scheduler, planner for the at least request and logs all transactions in a database server and wherein the application server defines transmissions areas based on at least one of geographical locations by extracting information from the topology of the communication network, and wherein said communication network comprises IPTV, Fixed telephony, GSM mobile communication, Satellite, CDMA, WCDMA, WiMAX, LTE, Advanced LTE, UMTS, 4G network, GPON, Wi-Fi, and wherein the application server defines intervals for transmitting the data content to the electronic device;

an application programmable interface server that interfaces with a cell broadcast system, a multimedia broadcast multicast system, IPTV, SMSC, MMSC, DVB-H and a content delivery platform system in the communication network and interfaces with at least one external service provider server;

a statistics server that generates reports interaction and requests of the at least one user;

a community server that interfaces with delivery, transportation, civil defense, hospital, police, emergency, and satellite center to send a service request of the at least one user to said centers;

the database server that stores all transactions and stores profiles of the at least one user, wherein the profiles of the at least one user includes demographics, location, interests, device type, and medical history of the at least one user and connects to central databases of the external service provides for data synchronization;

an administration server, and wherein the administration server uploads the data content, schedules transmission of the data content to users, defines geographical areas of transmission, views logs for all transactions, and generates reports, and wherein the data content comprises image, text, sound, video data, or command that triggers the electronic device to perform an action, and wherein the data content is interactive;

an application server media planner/manager configured to upload the data content to a content delivery platform, wherein the content delivery platform addresses an access network component to execute the command received from the application server media manger, and wherein the access network component is a base station controller;

one or more base transceiver stations for transmitting the uploaded data content to the electronic device, and wherein the electronic device includes an user interface for a CBC application installed on the electronic device for receiving and displaying the data content, and wherein the data content comprises image, text or video data;

a memory or network subscriber identification module (SIM card) installed with a computer program, and wherein the at least one user of the computer program is authenticated by associating a signature assigned to the at least one user;

wherein the electronic device is in communication with a system device via cell broadcast, SMS, MMS, GPRS, HSPA, Wi-Fi, Satellite, radio data connection, cable data connection and any data connection available on the electronic device;

wherein the data content is shuffled based on predetermined intervals of usage, and wherein the data content is shuffled at predetermined intervals based on a market or content provider targets or user preferences, and wherein the data content is displayed on the user screen, idle screen, and lock screen in a pattern, and wherein the pattern comprises covering a display screen, covering a portion of the display screen, replacing an operator logo, replacing a background picture, and scrolling as a banner.

2. The system for transmitting and /or receiving data content according to claim 1, wherein the system further comprises:
   an installer module configured for installing said computer program in the electronic device;
   an interactive updated booking scheduler configured for uploading data content on a portal, scheduling and planning the transmission by interactive updated booking scheduler, and selecting target receivers;
   means for sending the uploaded data content to one or plurality of communication network content delivery platforms through Cell broadcast, MBMS, SMS, MMS, GPRS, HSPA, IPTV;
      means for transmitting the uploaded data content by a content delivery platform to the electronic device, and wherein the computer program on the electronic device receives the data content from the corresponding content delivery platform interface;
   means for receiving user's service request from the computer program on the electronic device of the at least one user, forwarding the service request of the at least one user to a responsible service center through the community server; and
      statistics server configured for collecting usage and viewing statistics from the computer program of the at least one user.

3. The system for transmitting and/or receiving data according to claim 1 wherein the administration server is configured for registering a data content provider with a portal and for providing authentication credentials, and wherein the authentication credentials include a user defined Login-ID and Password.

4. The system for transmitting and /or receiving data content according to claim 1, wherein the system is further configured for entering users profile details and interest on a webpage prior to downloading the computer program on the electronic device, for storing the profiles of the at least one_users in the database server, and allowing the at least one_users to update their profile data from the installed computer program.

5. The system for transmitting and/or receiving data content according to claim 1, wherein the system is further configured for retrieving location of the at least one user by utilizing an operator location based service technology, GPS and radio cell information.

6. The system for transmitting and/or receiving data content according to claim 1, wherein the system is further configured for targeting the at least one users based on demographics information of the at least one user, request of the a t least one user, location of the at least one user, type of device of the at least one user, date and time, interest of the at least one user, and history of response of the at least one user to previous content.

7. The system for transmitting and/or receiving data according to claim 1, wherein the system is further configured for sending data content to the at least one user, a plurality of users, or all the users of a network operator depending on the requirements of the at least one user and a data content provider.

8. The system for transmitting and/or receiving data according to claim 1, further comprises:
   means for transmitting the at least at least one data content through a wireless application protocol link to the electronic device.

9. The system for transmitting and/or receiving data according to claim 1, wherein the system is further configured for directing the at least one user to additional information related to a data content of interest through SMS, Call completion and browser URL.

10. The system for transmitting and/or receiving data according to claim 1, wherein the command that triggers the electronic device to perform an action to updates the electronic device with the geographical area the electronic device is located in, and triggers the electronic device to push or pull information from the network based on the content of the command received.

11. A computer-readable non-transitory storage medium stored with a computer program executed on a computer device comprising a storage device configured to store a computer program and a data content and a hardware processor to execute a process on an electronic device connected to a communication network in broadcast, multicast and unicast mode, the process comprising steps of:
   installing a cell broadcasting system (CBS) application in the electronic device;
   storing the data content transmitted by a cell broadcast manager, which receives the data content from a plurality of cell broadcast entities;
   addressing an appropriate base station controller of a plurality of base station controllers comprising GPRS methodology for processing requests;
   installing a computer program/ a CBC application in the electronic device for providing a plurality of value added services;
   uploading the data content on a portal;
   providing the uploaded data content to a distributing broadcasting system;
   addressing an access network component to execute a command received from an application severs media manager through a content delivery platform, and wherein the access network component is a base station controller;
   transmitting the uploaded data content from the distributing broadcasting system to the electronic device through one or more base station transceivers;
   Shuffling the data content based on predetermined intervals of usage, and wherein the data content is shuffled at predetermined intervals based on a market or content provider targets or user preferences, and wherein the data content is displayed on the user screen, idle screen, and lock screen in a pattern, and wherein the pattern comprises covering a display screen, covering a portion of the display screen, replacing an operator logo, replacing a background picture, and scrolling as a banner;
   wherein the computer program/the CBC application in the electronic device is configured to receive and announce the data content on the electronic device, and wherein the data content comprises image, text, sound or video data or command that triggers the electronic device to perform an action.

* * * * *